United States Patent [19]

Torii et al.

[11] Patent Number: 4,984,162
[45] Date of Patent: Jan. 8, 1991

[54] WORD PROCESSOR WITH A MARGIN TEXT EDIT FUNCTION

[75] Inventors: Hiroshi Torii, Inazawa; Minoru Oishi, Nagoya; Tomohiro Ban, Iwakura; Akihiro Furukawa; Tokihito Furushima, both of Nagoya; Kazuko Nakagawa, Chita, all of Japan

[73] Assignee: Brother Kogyo Kabushiki Kaisha, Aichi, Japan

[21] Appl. No.: 386,635

[22] Filed: Jul. 31, 1989

Related U.S. Application Data

[63] Continuation-in-part of Ser. No. 72,403, Jul. 13, 1987, abandoned.

[30] Foreign Application Priority Data

Jul. 15, 1986 [JP] Japan .................. 61-166211

[51] Int. Cl.⁵ .................................................. G05B 15/00
[52] U.S. Cl. ............................................................ 364/518
[58] Field of Search ................ 364/518, 900; 340/721, 340/748, 750; 400/63, 76

[56] References Cited

U.S. PATENT DOCUMENTS

| 4,503,515 | 3/1985 | Cuan et al. ........................ 400/63 X |
| 4,506,343 | 3/1985 | Shipp, Jr. et al. ................ 364/900 |
| 4,573,138 | 2/1986 | Gaudet et al. .................... 400/63 X |
| 4,648,071 | 3/1987 | Repass et al. .................... 364/900 |
| 4,663,615 | 5/1987 | Hernandez et al. .............. 340/721 |

FOREIGN PATENT DOCUMENTS 094494 11/1983 European Pat. Off. .
094517 11/1983 European Pat. Off. .
185905 7/1986 European Pat. Off. .

OTHER PUBLICATIONS

Working with Word, The Definitive Guide to Microsoft ® Word on the Apple ® Macintosh ™, Chris Kinata et al., 1988, Primary Examiner—Gary V. Harkcom
Assistant Examiner—Mark K. Zimmerman
Attorney, Agent, or Firm—Oliff & Berridge

[57] ABSTRACT

A word processor having an output function for adding margin text, such as a heading or a footing to a main text, includes main text editor, margin text editor, print controller, display device and display device controller. The display controller displays the main text and the margin text simultaneously on the display device in the same form as they are printed out on a paper. Thus, the margin text can be set without printing while an operator confirms its print form.

13 Claims, 7 Drawing Sheets

```
..........1..........2..........3..........4....
          A bcd efghijk lmnop  qrstuv wxyz.
aaaaa  bbbbbbbbbbbbbbb   ccccccccccc ddd
eeeee  fff ggggg hh iiiii jjjjjj kkkkkk lllll
mmmmm  nnnnn.
          Qwerty uiop a sdfg hjkl zxcvbnm.■
                                              41
```

AREA A          FIG. 3B

HEADING
```
..........1..........2..........3..........4....
                QWERTYUI                "1/5"
                         OPASDFGHJKLZ
                         XCVBNM■  41
```

```
     Poiuytrewq lkj jh gfdsa mn bvcxz.
     A bcd efghijk lmnop  qrstuv wxyz.
aaaaa  bbbbbbbbbbbbbbb   ccccccccccc ddd
eeeee  fff ggggg hh iiiii jjjjjj kkkkkk lllll
mmmmm  nnnnn.
     Qwerty uiop a sdfg hjkl zxcvbnm.
```

AREA B
AREA B          FIG. 3C

FOOTING
```
..........1..........2..........3..........4....
aaaaa  bbbbbbbbbbbbbbb   ccccccccccc ddd
eeeee  fff ggggg hh iiiii jjjjjj kkkkkk lllll
mmmmm  nnnnn.
     Qwerty uiop a sdfg hjkl zxcvbnm.
```

```
                         poiuytrewq mnbvcxzz.
              "<1>"          mnbv■  41
```

AREA D

FIG. 3D

```
.........1.........2.........3.........4......
         A bcd efghijk lmnop  qrstuv wxyz.
aaaaa    bbbbbbbbbbbbb        cccccccc  ddd
eeeee    fff ggggg hh iiiiii  jjjjj kkkkk lllll
nnnnn.
         Qwerty uiop a sdfg hjkl zxcvbnm.■
```

WORD PROCESSOR WITH A MARGIN TEXT EDIT FUNCTION

This is a continuation-in-part of application Ser. No. 07/072,403, filed July 13, 1977, now abandonded.

BACKGROUND OF THE INVENTION

This invention relates to a word processor with a function of printing a main text with a margin text, e.g., a heading or a footing.

A known word processor has a function which adds desired text at a desired position in a margin of a desired page in a document, and outputs the margin text with the main text by a printer. A text output in a top margin of a main text is called a heading, and a text output in a bottom margin of a main text is called a footing.

For editing the margin text, one type of word processor changes the display of the main text to the display of the margin text. In this case, the main text is not displayed on a screen along with the margin text, therefore an operator cannot confirm the positional relationship between the main text and the margin text on the screen. In a second type of word processor, the margin text is displayed with the main text in only a certain page where the margin text is set. Thus, a displayed screen of the other pages is different from the real printing form.

SUMMARY OF THE INVENTION

It is an object of this invention to provide a word processor in which the operator can confirm the final printing form of the margin text and its relationship to the main text on the screen without printing, while the operator is editing the margin text.

It is another object of this invention to provide a word processor in which the operator can freely edit the margin text within a preset margin text frame independently of the main text displayed on the screen during editing of the margin text.

According to this invention, a word processor operable both in a main text edit mode and in a margin text edit mode comprises: display means for displaying text data of plural lines; main text edit means that function only in a main text edit mode for editing main text; margin text edit means that function only in a margin text edit mode for editing margin text within a margin text frame that is preset as a region of the display means, and wherein the margin text is to be printed in a margin outside the main text on a paper; print means for printing the main text with the margin text on the paper; first display control means that function only in the main text edit mode for displaying only the main text on the display means; and second display control means that function only in the margin text edit mode for displaying the margin text within the margin text frame on the display means, for scrolling up and/or down the main text on the display means and for displaying the main text with the rest of the margin text frame on the display means.

BRIEF DESCRIPTION OF THE DRAWINGS

The invention will now be described with reference to the accompanying drawings wherein.

DETAILED DESCRIPTION OF PREFERRED EMBODIMENT

Figure 1:
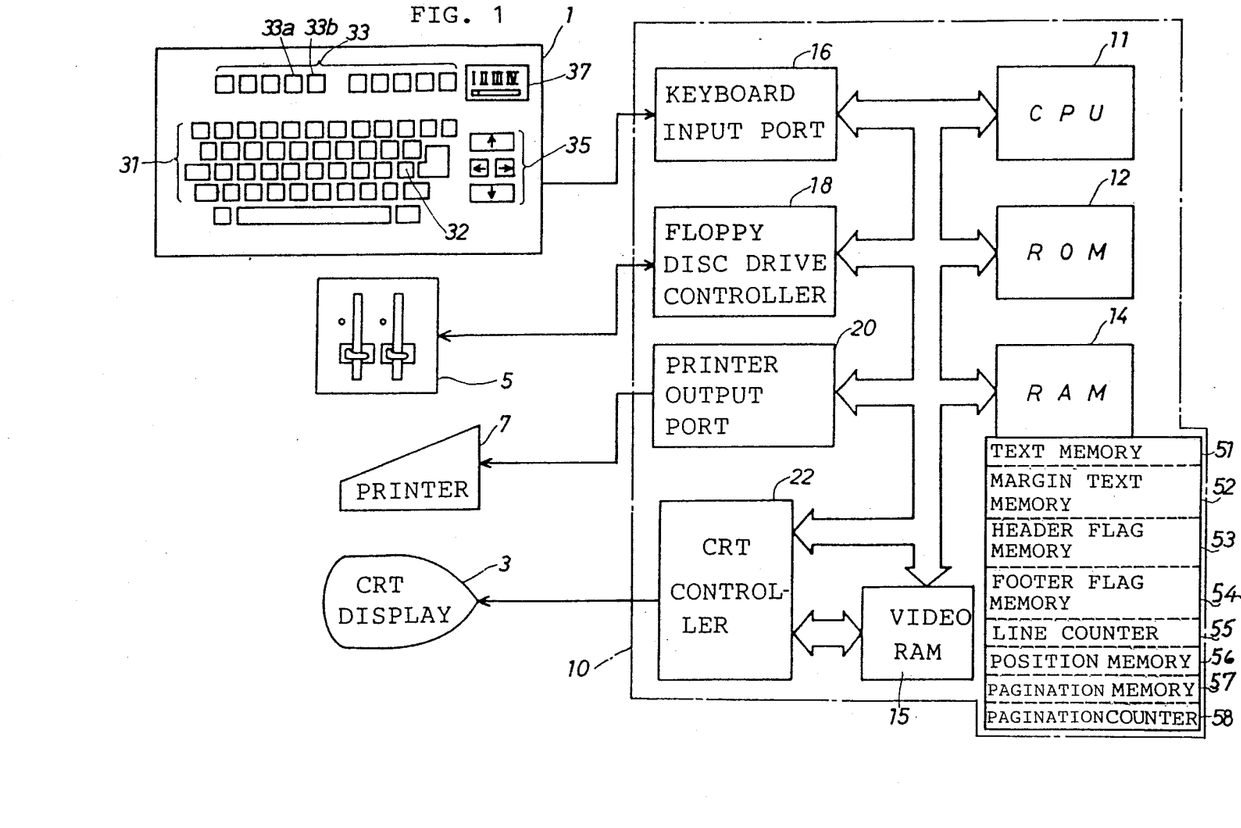
FIG. 1 is a schematic block diagram of the components of an embodiment of a word processor according to the invention.

Referring to the figures, a preferred embodiment comprises a word processor in which the top section or the bottom section of a main text in the desired page is displayed with the margin text, i.e., heading or footing, when the margin text is edited. As shown in FIG. 1, the word processor of this invention is provided with a keyboard 1 for inputting characters or edit commands; a display (a CRT display) 3 for displaying characters or figures; a floppy disc drive 5 as an external memory device; a printer 7 for printing characters or figures with type from a daisy wheel; and an electronic control unit (ECU) 10, connected to the devices 1, 3, 5 and 7, for controlling inputting, editing, storing and printing of a text. The ECU 10 is a microcomputer, including CPU 11, ROM 12 and RAM 14. The ROM 12 stores various control programs, such as a program for controlling the CRT display 3, a program for generating heading or footing data for each page when a heading of a footing is set, and a pagination program. The RAM 14 includes a text memory 51 for storing main text data, a margin text memory 52 for storing margin text data consisting of heading data and footing data, a header flag memory 53 for storing the state of a header flag that is set when heading data is stored, a footer flag memory 54 for storing the state of a footer flag that is set when footing data is stored, a line counter 55 for counting the total line numbers of the heading data and the footing data, a position memory 56 for storing positions of numeral data inside double quotation marks in the heading and footing areas (described later), a pagination memory 57 for storing a pagination-start page number and its numeral information, a pagination counter 58 that is incremented every page, and other counters and registers. The ECU 10 is further provided with a video RAM 15 for storing picture data of characters or figures which are displayed on the CRT display 3, a keyboard input port 16 for inputting data from the keyboard 1, a floppy disc drive controller 18 for controlling the floppy disc drive 5 so as to read or write the data, a printer output port 20 for outputting the printing data to the printer 7. The video RAM 15 has structure including a so-called dual port RAM and can be accessed, besides by the CPU 11, by a CRT controller 22 provided independently of the CPU 11. The CRT controller 22 repeatedly reads out data from the video RAM 15 in a cycle determined by a scanning frequency of the CRT display 3, and displays it on the CRT display 3. Accordingly, data written in a predetermined area of video RAM 15 by CPU 11 is immediately displayed on the CRT display 3.

The keyboard 1 is provided with character keys 31 for inputting characters, ten edit keys 33 for editing the text, four cursor keys 35 for moving a cursor 41, double quote key 32 for pagination, and a keyboard switch 37 for altering assignment of characters to the keys on the keyboard 1 by selecting the type of desired daisy wheels.

An operator can input the text by operating the character keys 31. Moreover, by operating edit keys 33, such as a heading key 33a or a footing key 33b, the operator can edit another text so as to add the heading or the footing to the text. The edited text can be stored into a floppy disc set in floppy disc drive 5 controlled by floppy disc drive controller 18. Also, the text can be output to the printer 7 to be printed on a paper.

With reference to FIGS. 2, 3A, 3B, 3C, and 3D the procedure for setting the margin text will now be explained.

Figure 2:
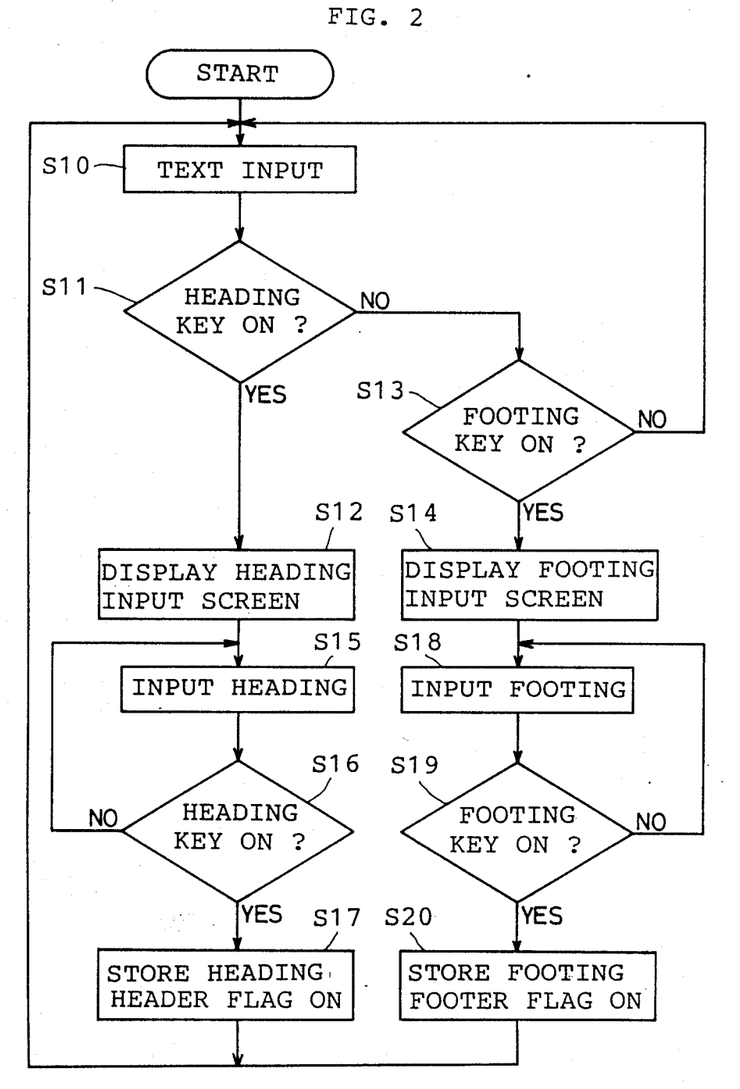
FIG. 2 is a flow chart illustrating the control routine performed by the embodiment of FIG. 1.
Figure 3A:
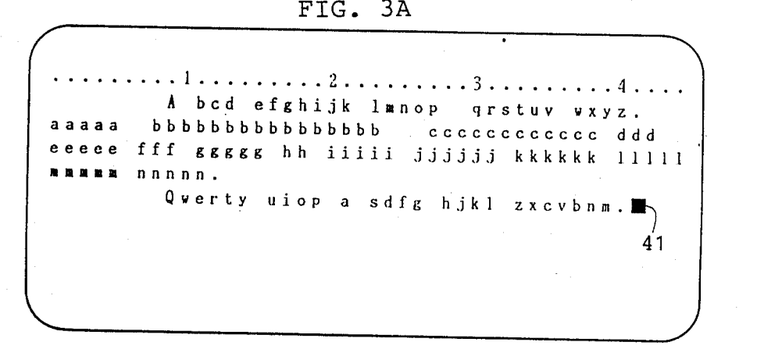
FIGS. 3A, 3B, 3C, and 3D are explanatory figures showing screens for inputting a main text, a heading, and a footing, respectively.
Figure 3B:
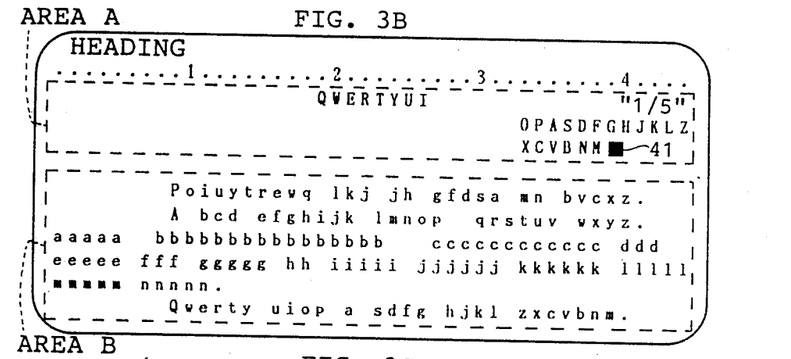

Referring specifically to the flow chart of FIG. 2, the control routine for setting the margin text starts with the main text being input at S10. The main text is shown in FIG. 3A which is an explanatory figure showing a screen for inputting a main text. It is determined at S11 whether the heading key 33a is operated. If the determination is YES, the picture as shown in FIG. 3B is input into the video RAM 15 by the CPU 11, according to the program stored in the ROM 12, and the input picture is displayed on the CRT display 3 at S12. Then the heading text edit mode begins instead of the main text edit mode. As shown in FIG. 3B, the screen for inputting the heading is divided into two areas. One is an area A for inputting the heading having a predetermined number of lines (three lines in the drawing) at the upper part of the screen. The other is an area B for displaying the top section of the main text of the page, when the heading key 33a is occasionally operated at the lower part of the area A. That is, the area B is scrolled down until the first line of the main text is displayed just below the area A.

Figure 3C:
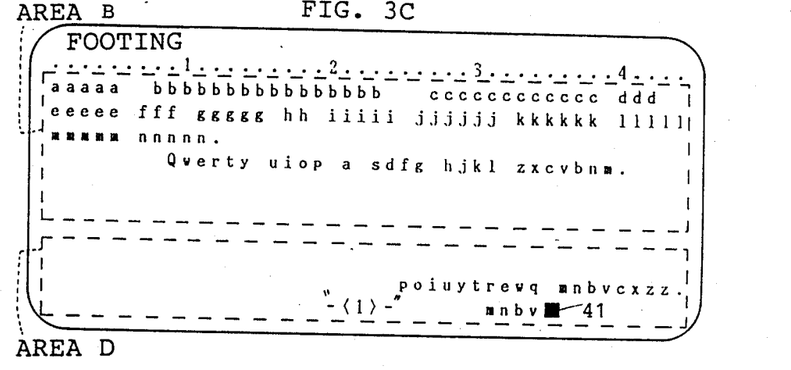

On the contrary, if the determination is NO at S11, the program proceeds to S13, at which it is determined whether the footing key 33b is operated. If the determination is YES, the picture as shown in FIG. 3C is input into the video RAM 15 by the CPU 11, according to the program stored in the ROM 12, and the input picture is displayed on the CRT display 3 at S14. Then the footing text edit mode begins instead of the main text edit mode. As shown in FIG. 3C, the screen for inputting the footing is also divided into two areas. One is an area D for inputting the footing having a predetermined number of lines (three lines in the drawing) at the lower part of the screen. The other is the area B for displaying the bottom section of the main text of the page, when the footing key 33b is occasionally operated, at the upper part of the area D. That is, the area B is scrolled up until the last line of the main text is displayed just above the area D. If the determination is NO at S13, the process step returns to S10.

In case the process step proceeds through S10, S11 and S12, i.e., in the heading text edit mode, the heading text is input at S15. The heading can be edited by freely moving the cursor 41 by means of cursor keys 35 within the area A in the same manner as in the main text edit mode. That is, character data or control code data input by the keyboard 1 are written at an address of the RAM 14 corresponding to the position of the cursor 41 displayed on the CRT display 3. Within the area A, various editing functions or printing effects do not affect the printing form of the main text. Specifically, the margin text is edited independently from the main text. Every time the line number of the margin text (sum of the lines for the heading text and the footing text) is increased by one, the line counter 55 is incremented. When the line number exceeds a predetermined marginal line number (e.g., 10 lines), a buzzer warns that no more data can be received. On the other hand, the line counter 55 is decremented every time the line number of the margin text is decreased by one. The area A can be expanded until the area A exceeds the predetermined marginal line number. Depending on the expansion of the area A, the area B is scrolled down, and the display area for the main text becomes narrower.

When the heading is input, it is again determined at S16 whether the heading key 33a is operated. If the determination is YES, it is assumed that the input of the heading ends, and the heading set as above is stored in the margin text memory 52 of the RAM 14 or on a floppy disc in the floppy disc drive 5 (described later) at S17. Then the process steps return to S10.

Figure 3D:
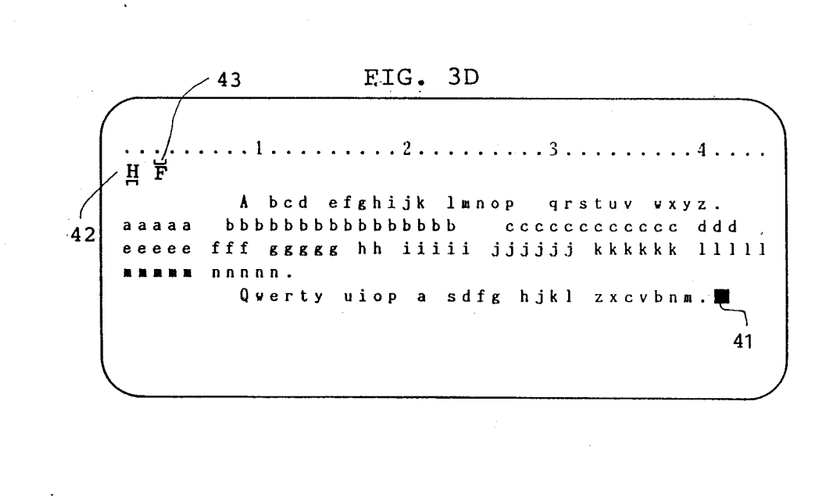

As shown in FIG. 3D, the input of the main text resumes from the position where the cursor 41 was located when the heading key 33a is operated at S11. On the contrary, if the determination is NO at S16, the input of the heading continues at S15. The area B is scrolled down one line, and the top line is used as a display area for indicating whether the heading and/or footing are set. When the heading and/or footing are set, marks H 42 and/or F 43 are displayed at the left margin position.

If it is determined the footing key 33b is operated at S13, the process steps for editing the footing are executed in the same manner as for the heading. That is, the picture as shown in FIG. 3C is displayed at S14, and the footing text is input at S18. An area D can be expanded until the area D exceeds a predetermined marginal line number. Depending on the expansion of the area D, the area B is scrolled up and the display area for the main text becomes narrower. During inputting, it is determined at S19 whether the footing key 33b is operated. If the determination is YES, it is assumed that the input of the footing ends, and the footing set as above is stored into the margin text memory 52 of the RAM 14 or on a floppy disc in the floppy disc drive 5 at S20. Then the process step returns to S10. On the other hand, if the determination is NO at S19, the input of the footing continues at S18. Upon inputting the footing, the printing form of the footing can be freely set so far as within the area D in the same manner as for inputting the heading.

When the heading key 33a or the footing key 33b is operated, and the heading or the footing is already set, the set heading or footing can be displayed in the area A or D based on the heading or footing data in the margin text memory 52, and then can be modified.

Figure 5A:
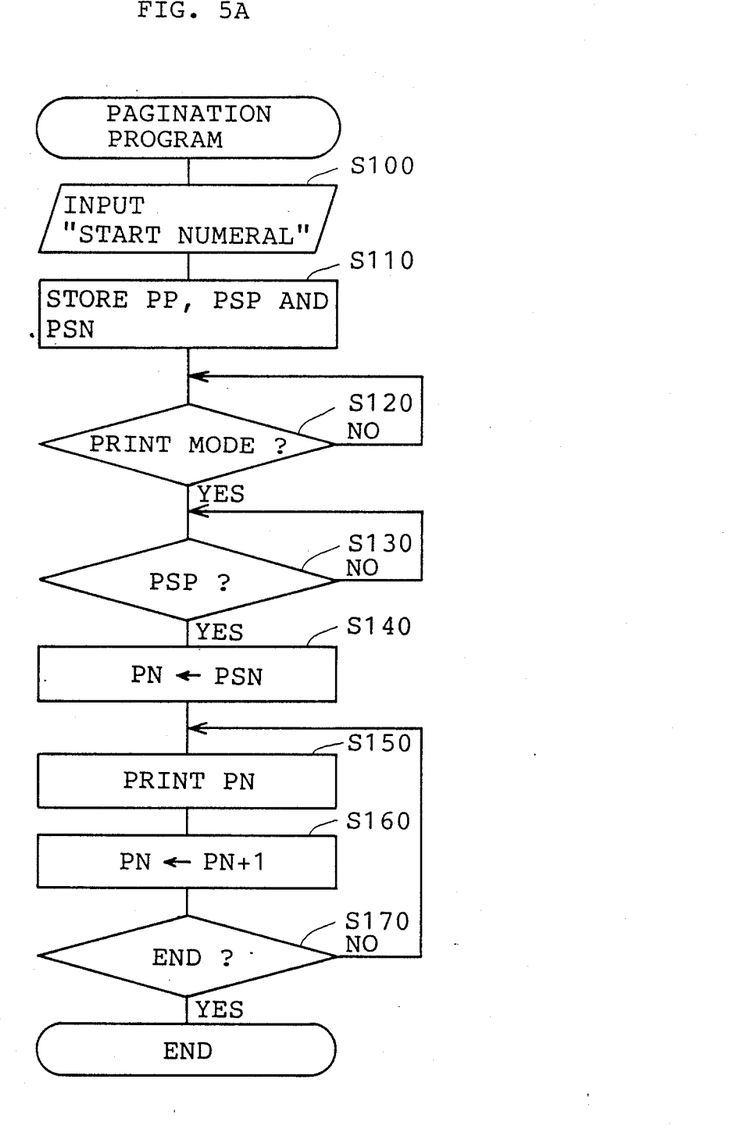
FIGS. 5A and 5B are flowcharts of pagination program routines.
Figure 5B:
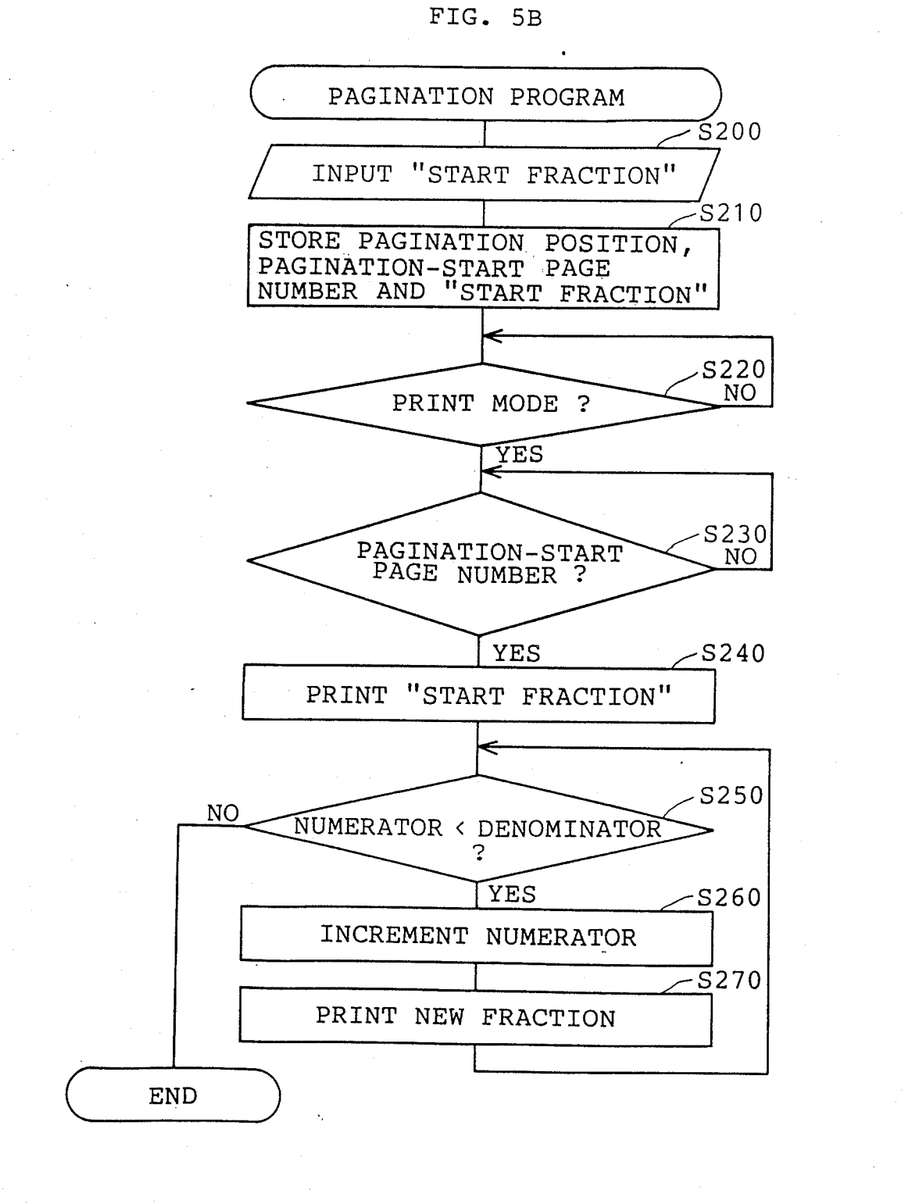

Pagination can be set at any position within the area A or D during the editing of the heading text or of the footing text (see FIG. 3C). As shown in FIGS. 3C and 5A, when the text of the fifth page, for example, is displayed on the screen, the cursor 41 is moved to a desired position and "—<1>—" is input by operation of the keyboard 1 (step S100). the position memory 56 stores a pagination position PP, and the pagination memory 57 stores pagination-start page number PSP (=5) and its numeral information PSN (=1) (step S110). Based on the pagination counter 58, (=5), the pagination is automatically executed from the next page of the PSP in a form such as —<2>— and —<3>— during printing (steps S120 through S170). As shown in FIGS. 3B and 5B, if "1/5" is input at a desired position within the area A (steps S200 and S210), the fractions 2/5 through 5/5 are sequentially printed for the next page of the pagination-start page (steps S220 through S270). That is, the pagination is repeatedly executed until the value of the numerator is equal to that of the denominator (step S250 through S270). Then the pagination program ends.

In an embodiment having the above-mentioned structure, when the margin text is being edited, the top or the bottom of the main text at the page where the heading key 33a or the footing key 33b is operated, is displayed with the margin text on the CRT display 3 in the same form as printed on a paper. Thus, the operator can confirm the positional relationship between the main text and the margin text when the margin text is set. In this case, the word processor is operable by the operator's choice in two modes: either only the main text is printed out (normal print mode) or the main text and the margin text are printed out together (margin text print mode).

Figure 4:
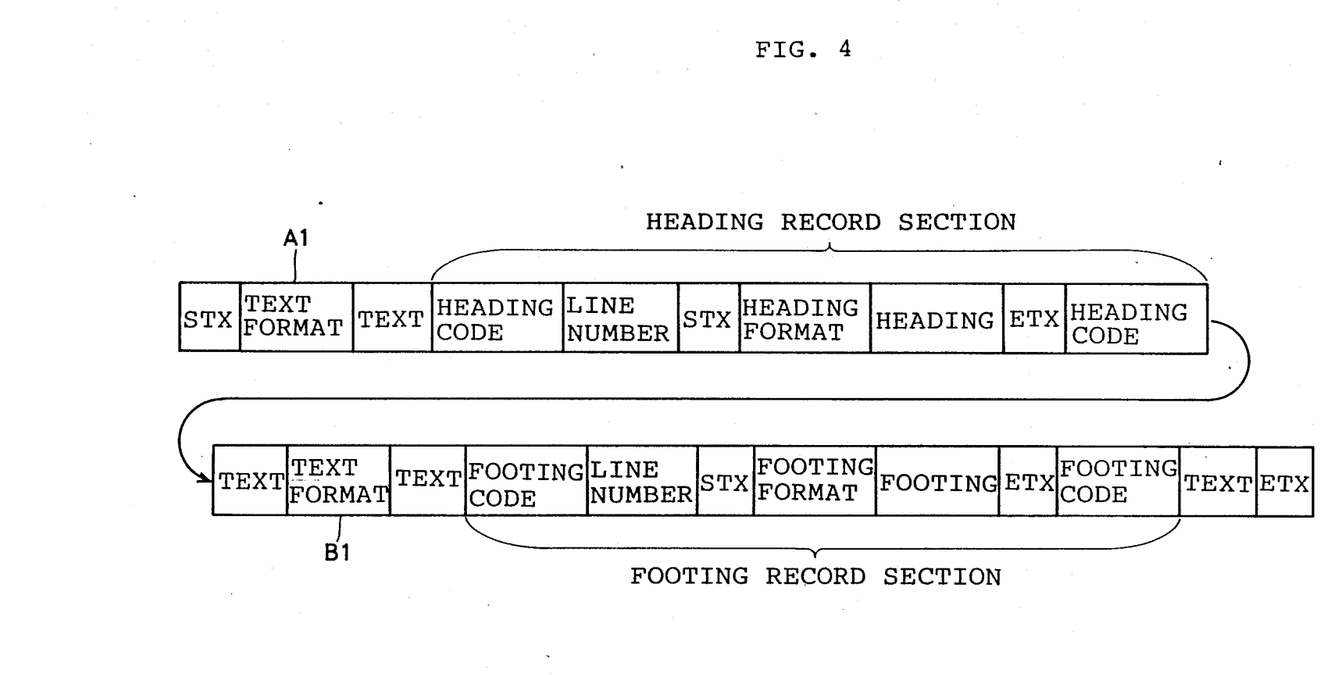
FIG. 4 is diagrammatic figure showing data arrangement in a text file stored in an external memory device.

The heading or the footing set as above is stored in the RAM 14 or on a floppy disc in the floppy disc drive 5, with the data arranged in a text file shown in FIG. 4.

The data of a text is aligned in order, in a sequence of a STX code (a code for showing start of the text), format of the text, the text, and an ETX code (a code for showing end of the text). Here, the format of the text can be set at optional positions and different formats are set in a text. They are set, for example in FIG. 4, at A1 and B1. The margin text, i.e., heading or footing, is recorded at an appropriate position in the main text file. A margin text record section stores in order a margin record start code (heading code, footing code), a line number of the margin text, the STX code, format of the margin text, the margin text (heading, footing), the ETX code, and the margin record end code (heading code, footing code).

The edited text is output from the printer output port 20 and is printed by the printed 7 according to the above text file of the RAM 14. When the margin text is set in a certain position of the file, the margin text is printed on every subsequent page according to the printing format. Various different margin texts can be set in a main text, and are stored in the main text file as shown in FIG. 4. The format of the margin text can be changed as occasion demands. The margin text may be recorded in a file independent of the main text file.

While the invention has been particularly shown and described with reference to a preferred embodiment, it will be understood by those skilled in the art that various other changes in from and detail may be made without departing from the spirit and scope of the invention.

What is claimed is:

1. A word processor operable both in a main text edit mode and in a margin text edit mode comprising:
    display means attached to the word processor for displaying text data of plural lines;
    main text edit means that function only in the main text edit mode for editing a main text displayed on the display means;
    margin text edit means that function only in the margin text edit mode for editing a margin text displayed on the display means, wherein the margin text is to be printed in a margin outside the main text on a paper;
    print means attached to the word processor for printing the main text with the margin text on the paper upon command;
    means for placing the word processor in one of the main text edit and margin text edit modes;
    first display control means that function only in the main text edit mode for displaying only a portion of the main text on the display means;
    second display control means that function only in the margin text edit mode for displaying the margin text within a margin text frame, which expands or contracts according to a change in a number of margin text lines, in a first region of the display means and for displaying and adjusting up and/or down a portion of the main text compensating for the change in the number of margin text lines; wherein
    the second display control means displays a bottom line of a page of the main text just above the margin text frame when the first region is displayed below the second region and automatically scrolls the main text to change the bottom line to compensate for the expansion and contraction of the margin text frame on a line for line basis; and
    the second display control means displays a top line of a page of the main text just below the margin text frame when the first region is displayed above the second region and automatically scrolls the main text to change the bottom line to compensate for the expansion and contraction of the margin text frame on a line for line basis.

2. A word processor according to claim 1, wherein the word processor is operable both in a normal print mode and in a margin text print mode; and
    the print means print only the main text in the normal print mode and print the main text with the margin text in the margin text print mode.

3. A word processor according to claim 2, wherein the margin text is a heading that is printed in a top margin above the main text printed on the paper, and the first region is located above the second region.

4. A word processor according to claim 2, wherein the margin text is a footing that is printed in a bottom margin below the main text printed on the paper, and the first region is located below the second region.

5. A word processor according to claim 2, wherein the margin text comprises a heading that is printed in a top margin above the main text printed on the paper and a footing that is printed in a bottom margin below the main text printed on the paper; and
    when the heading is edited in the margin text edit mode, the first region is located above the second region and, then the footing is edited in the margin text edit mode, the first region is located below the second region.

6. A word processor according to claim 5, further comprising:
    margin-print-starting page setting means for storing a page number of the main text at which the margin text is edited by the margin text edit means as a margin-print-starting page, and
    said print means prints the main text with the margin text on the margin-print-starting page and on pages that follow the margin-print-starting page in the margin text print mode.

7. A word processor according to claim 2, further comprising:
    page number inputting means for inputting first numeral information to an optional position in the margin text associated with a page of the main text, and
    pagination means for paginating pages by incrementing the first numeral information automatically for the pages following the optional page on which the first numeral information is inputted.

8. A word processor according to claim 7, wherein the numeral information is integral.

9. A word processor according to claim 9, wherein the numeral information is a fraction comprising a numerator and a denominator that indicates the total number of pages in the main text; and the pagination means increments the numerator of the fraction unit the numerator is equal to the denominator of the fraction.

10. A word processor operable in a main text edit mode for editing and in a margin text edit mode for editing margin text having a heading, which is printed in a top margin of the main text printed on a piece of paper, and a footing, which is printed in a bottom margin of the main text printed on the paper, comprising:

means for placing the word processor in one of the main text edit and margin edit modes;

at least one memory device in which the main text and margin text are stored in a text file, where the main text comprises main text data and main text format data, the margin text comprises margin text data and margin text format data, and the margin text format data is independent of the main text format data; and wherein the text file in the memory device further comprises one or more margin text record section, where the one or more margin text record section includes a top field separator, a line number data, a start code, a format data a margin text data, an edit code and an end field separator.

11. A word processor operable in any one of a main text edit mode for editing main text, a first margin text mode for editing margin text comprising a heading that is printed in a top margin of the main text printed on a piece of paper, or a second margin text edit mode for editing margin text comprising a footing that is printed in a bottom margin of the main text printed on the paper, comprising:

means for placing the word processor in one of the main text editor and margin text editor modes;

a memory device in which the main text and the first and second margin text are stored making a text file, such that the text file comprises a margin text record section that includes a top field separator, line number data, a start code, format data, margin data text edit data, an exit code, and an end field separator, the format data representing exclusively a format of the margin text independent of a format of the main text;

display means for displaying plural lines of text data;

main text edit means that function only in a main text edit mode for editing the main text contained in the memory device;

first margin edit text means that function only in the first margin text edit mode for editing the first margin text contained in the memory device within a first margin text frame that is preset as an upper region on the display means;

second margin text edit means that function only in the second margin text edit mode for editing the second margin text contained in the memory device within a second margin text frame that is preset as a lower region on the display means;

print means for printing the text file on the paper;

first display control means that function only in the text edit mode for displaying only the main text contained in the memory device on the display means;

second display control means that function only in the first margin text edit mode for displaying the first margin text contained in the memory device within the first margin text frame on the display means and for scrolling down the main text displayed on the display means until the first line of a page of the main text is displayed just below the first margin text frame; and third display control means that function only in the second margin text edit mode for displaying the second margin text contained in the memory device within the second margin text frame on the display means and for scrolling up the main text displayed on the display means until the last line of a page of the main text is displayed just above the second margin text frame.

12. A word processor operable both in a main text edit mode and in a margin text edit mode comprising:

display means attached to the word processor for displaying text data of plural lines;

main text edit means that function only in the main text edit mode for editing a main text displayed on the display means;

margin text edit means that function only in the margin text edit mode for editing a margin text displayed on the display means, wherein the margin text is to be printed in a margin outside the main text on a paper, said margin text comprising a heading that is printed in a top margin above the main text printed on the paper and a footing that is printed in a bottom margin below the main text printed on the paper such that when the heating is edited in the margin text edit mode, the first region is located above the second region and, when the footing is edited in the margin text mode, the first region is located below the second region;

print means attached to the word processor for printing the main text with the margin text on the paper upon command, the word processor being operable both in a normal print mode and in a margin text mode, said print means printing only the main text in the normal print mode and printing the main text with the margin text in the margin text print mode;

means for placing the word processor in one of the main text edit and margin text edit modes;

margin-print-starting page setting means for storing a page number of the main text at which the margin text is edited by the margin text edit means as a margin-print-starting page, and said print means prints the main text with the margin text on the margin-print-starting page and on pages that follow the margin-print-starting page in the margin text print mode;

margin-print-page indicating means that function in the main text edit mode for displaying information on a preset line of the display means, wherein the information indicates whether the portion of the main text displayed on the display means has a margin text associated therewith;

first display control means that function only in the main text edit mode for displaying only a portion of the main text on the display means;

second display control means that function only in the margin text edit mode for displaying the margin text within a margin text frame, which expands or contracts according to a change in a number of margin text lines, in a first region of the display means and for displaying and adjusting up and/or down a portion of the main text displayed in a second region of the display means thereby compensating for the change in the number of margin text lines; wherein the second display control means displays a bottom line of a page of the main text just above the margin text frame when the first region is displayed below the second region and automatically scrolls the main text to change the bottom line to compensate for the expansion and contraction of the margin text frame on a line for line basis; and the second display control means displays a top line of a page of the main text just below the margin text frame when the first region is displayed above the second region and automatically scrolls the main text to change the bottom line to compensate for the expansion and contraction of the margin text frame on a line for line basis.

13. A word processor according to claim 12, wherein the information indicates whether the margin text comprises a heading and/or a footing.

* * * * *